(12) United States Patent
Kakinoki et al.

(10) Patent No.: US 6,290,513 B1
(45) Date of Patent: Sep. 18, 2001

(54) PC CARD SWITCHABLY COMPATIBLE WITH 16-BIT AND 32-BIT MODES

(75) Inventors: Wataru Kakinoki, Yokohama; Akira Hirabayashi, Kanazawa, both of (JP)

(73) Assignees: Murata Manufacturing Co., Ltd.; I-O Data Device, Inc., both of (JP)

( * ) Notice: Subject to any disclaimer, the term of this patent is extended or adjusted under 35 U.S.C. 154(b) by 0 days.

(21) Appl. No.: 09/198,898

(22) Filed: Nov. 24, 1998

(30) Foreign Application Priority Data

Nov. 27, 1997 (JP) .................................................. 9-342149
Dec. 17, 1997 (JP) .................................................. 9-364146

(51) Int. Cl.⁷ .................................................. H01R 13/648
(52) U.S. Cl. .................................................. 439/108; 439/95
(58) Field of Search .............................. 439/95, 92, 76.1, 439/946, 609, 607

(56) References Cited

U.S. PATENT DOCUMENTS 5,112,231   5/1992   Harwath et al. ........................ 439/60
5,307,242 * 4/1994   Seibold et al. ........................ 439/609
5,316,501 * 5/1994   Mair ..................................... 439/609
5,403,208   4/1995   Felcman et al. ...................... 439/633

* cited by examiner

Primary Examiner—Gary Paumen
(74) Attorney, Agent, or Firm—Ostrolenk, Faber, Gerb & Soffen, LLP

(57) ABSTRACT

The PC card of the present invention preferably includes a logic circuit operating in either a 16-bit mode or a 32-bit mode, a ground line on the circuit, a connector for transferring a signal between the circuit and the external device, and a series of elastic metal members arranged on the top surface of the connector and connected to the ground line. When the connector of the PC card is inserted into the PC card slot, the elastic metal member is retained by a support frame arranged on the periphery of the PC card slot, and is deformed upward toward the top surface of the connector. When the PC card is fully inserted into the slot, the elastic metal member urges the support frame and both are firmly connected.

19 Claims, 12 Drawing Sheets

PC CARD SWITCHABLY COMPATIBLE WITH 16-BIT AND 32-BIT MODES

CROSS-REFERENCE TO RELATED APPLICATIONS

This application is related to copending application Ser. No. 09/199,995, entitled PC CARD CAPABLE OF SWITCHING BETWEEN 16-BIT AND 32-BIT OPERATION MODES, filed Nov. 24, 1998, the entire disclosure of which is hereby incorporated by reference.

BACKGROUND OF THE INVENTION

1. Field of the Invention

The present invention relates a PC (Personal Computer) card to be mounted in a computer system and, more particularly, to a PC card that is detachably mountable in a 16-bit card slot or a 32-bit card slot.

2. Description of the Related Art

A PC card is a peripheral device that has been developed to help extend the functions of a personal computer. Standards of the mechanical and electrical characteristics of PCs are now being formulated under the aegis of PCMCIA (Personal Computer Memory Card Interface Association) and JEIDA (Japan Electronic Industry Development Association). Besides memory cards, a plurality of different PC cards including flash memory cards, HDD (Hard Disk Drive) cards, and FAX/MODEM cards are now commercially available.

These cards are classified into 8-bit cards, 16-bit cards, 32-bit cards and the like according to the particular internal data bus width. The PC card slots of personal computers which are commercially available may receive any type of PC cards. However, some conventional personal computers can only receive 16-bit cards and 32-bit cards cannot be inserted into their PC card slots.

According to the standard, a projection is provided in the card slot of a personal computer to identify the type of a PC card being inserted. A groove which is deep enough to receive the projection is provided in the vicinity of a connector of the PC card. The standard specifies that the height of the projection for a 16-bit PC card slot be higher than that of a 32-bit PC card slot. The projection serves as an obstacle, making it impossible to insert a 32-bit card having a shallower groove into a 16-bit PC card slot. Since the driving voltage of the 32-bit card is 3.3 V while the driving voltage of the 16-bit card is 5.0 V, such a setting advantageously protects the internal circuitry of the card.

The standard also specifies that the top surface of the connector of the 32-bit PC card be provided with a predetermined number of projecting portions producing a ground terminal having a predetermined height. The projecting portions are intended to assure the connection between a circuit board in the PC card and the ground of the personal computer, and to perform reliable and fast data transfer between the PC card and the computer. Such a requirement is not imposed for the 16-bit PC card.

As the performance requirements of the personal computer increase, the bus of the PC card generally shifts from an 8-bit width to a 16-bit width and to a 32-bit width. Most new PC cards currently on sale are of the 32-bit variety. However, there are many users who still use personal computers having only 16-bit card slots. A new PC card capable of operating in both 32-bit mode and 16-bit mode may be accepted by many more users.

The standard, however, does not permit the 32-bit card to be inserted into the 16-bit card slot. Even if the groove is deepened, the projecting portions on the connector still restrict the insertion of the card into the slot.

SUMMARY OF THE INVENTION

Accordingly, it is an object of the present invention to provide a 32-bit PC card that is switchable between a 16-bit mode and a 32-bit mode and is insertable into a 16-bit card slot with a ground connection firmly established. The switching operation between the 16-bit and 32-bit modes is discussed in copending application Ser. No. 09/199,995.

According to one aspect of the present invention, the PC card includes (a) a circuit, (b) a ground line on the circuit, (c) a connector for interfacing the circuit with an external device, and (d) an elastic projection, connected to the ground line and arranged on one surface of the connector.

The PC card of the present invention preferably includes (a) a logic circuit operating in either a 16-bit mode or a 32-bit mode, (b) a ground line on the circuit, (c) a connector for transferring a signal between the circuit and the external device, and (d) a series of elastic metal members arranged on the top surface of the connector and connected to the ground line. When the connector of the PC card is inserted into the PC card slot, the elastic metal member is retained by a support frame arranged on the periphery of the PC card slot, and is deformed upward toward the top surface of the connector. When the PC card is fully inserted into the slot, the elastic metal member is urged against the support frame and both are firmly connected. Since the ground line is provided on the support frame where the metal member contacts the support frame, the ground potential of the PC card and the ground potential of a personal computer are equalized. This contributes to reliable data communication between the PC card and the personal computer.

These and other objects, features and advantages of the present invention will become more apparent when the following detailed description of embodiments of the present invention is considered with the drawings.

DESCRIPTION OF EMBODIMENTS OF THE INVENTION

Referring to FIG. 1 through FIG. 8, the first embodiment of the present invention is now discussed in detail.

Figure 1:
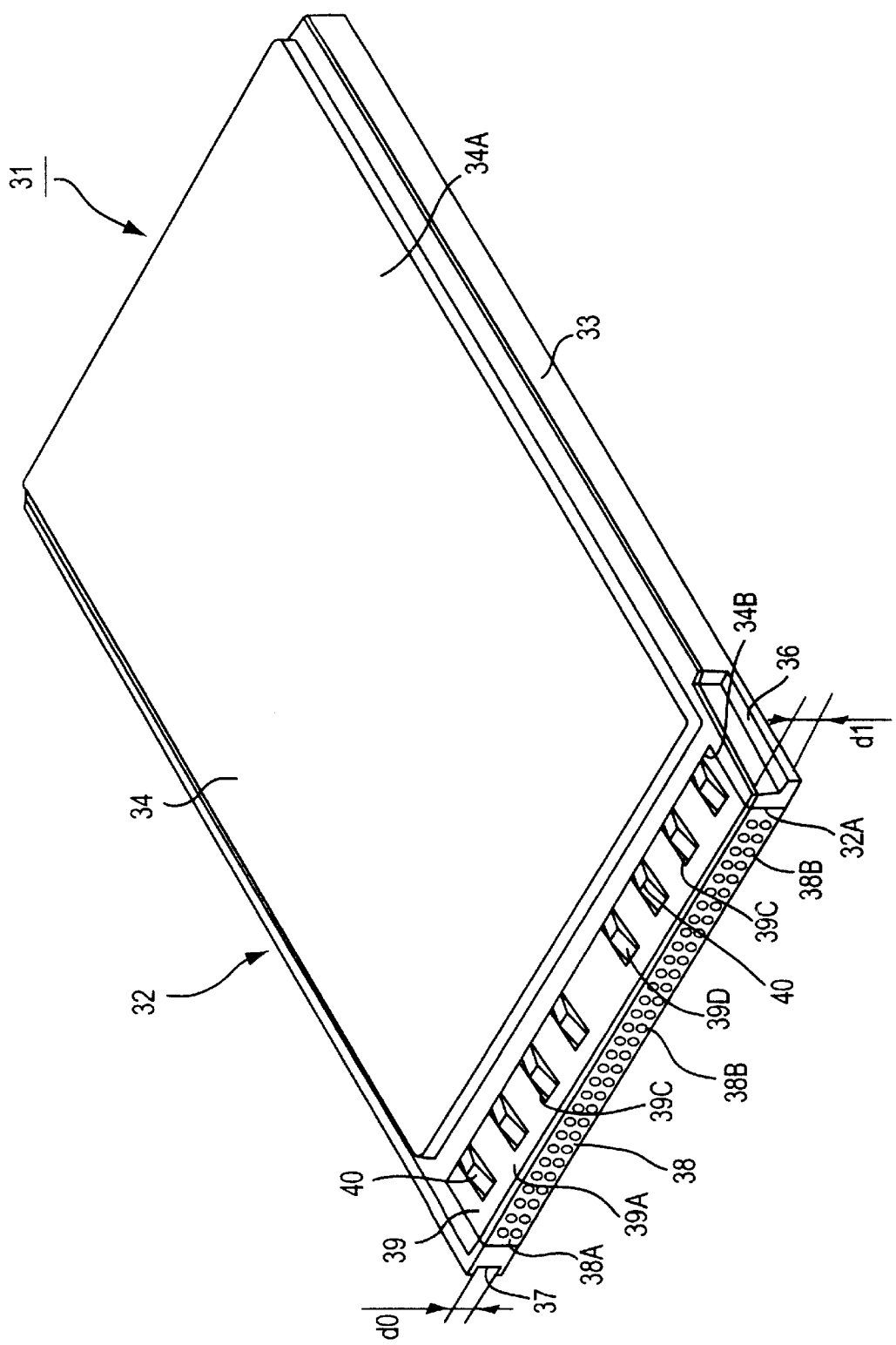
FIG. 1 is a perspective view of a 32-bit PC card of a first embodiment of the present invention.

There is shown in FIG. 1 a PC card 31 of a first embodiment of the present invention (hereinafter referred to as a 32-bit PC card 31) compatible with both 16-bit mode and 32-bit mode operation, and a casing 32 of a thin-plate configuration, serving as an external casing of the 32-bit PC card 31. The casing 32 includes a thin, U-shaped frame body 33 with its top and bottom sides opened, panels 34 each having a rectangular projecting portion 34A for closing the respective top and bottom openings of the frame body 33, and a circuit board accommodation space 35 therewithin.

One end of the casing 32 is opened and forms a connector mounting opening 32A, and a card-side connector 38 is secured in the connector mounting opening 32A. One panel 34 of the two, arranged on the top side, has an electrode plate accommodation cutout 34B extending horizontally on its side of the connector mounting opening 32A. Electronic components 7 (not shown) mounted on a circuit board 6 (FIGS. 3–8) housed in the circuit board accommodation space 35 of the casing 32 are compatible with a 32-bit mode of operation (using a driving voltage of 3.3 V) and a 16-bit mode (using a driving voltage of 5.0 V).

The frame body 33 is provided with a card-side key groove 36 on its left-hand side with respect to the direction of insertion of the frame body 33, viewed from behind. The card-side key groove 36 is formed by cutting partially the top surface of the frame body 33 of the casing 32 at the left-hand side wall with respect to the direction of insertion, in the vicinity of the connector mounting opening 32A. The card-side key groove 36 has a width d1 equal to that of the card-side key groove 8 of the 16-bit PC card 1.

The frame body 33 is also provided with a guide groove 37 on its right-hand side with respect to the direction of insertion. The guide groove 37 is formed by providing a relief in the side wall of the frame body 33 on the right-hand side with respect to the direction of insertion, in the vicinity of the connector mounting opening 32A of the frame body 33 of the casing 32. The guide groove 37 has a groove width d0 equal to that of a guide groove 22 of the 32-bit PC card 16.

Figure 3:
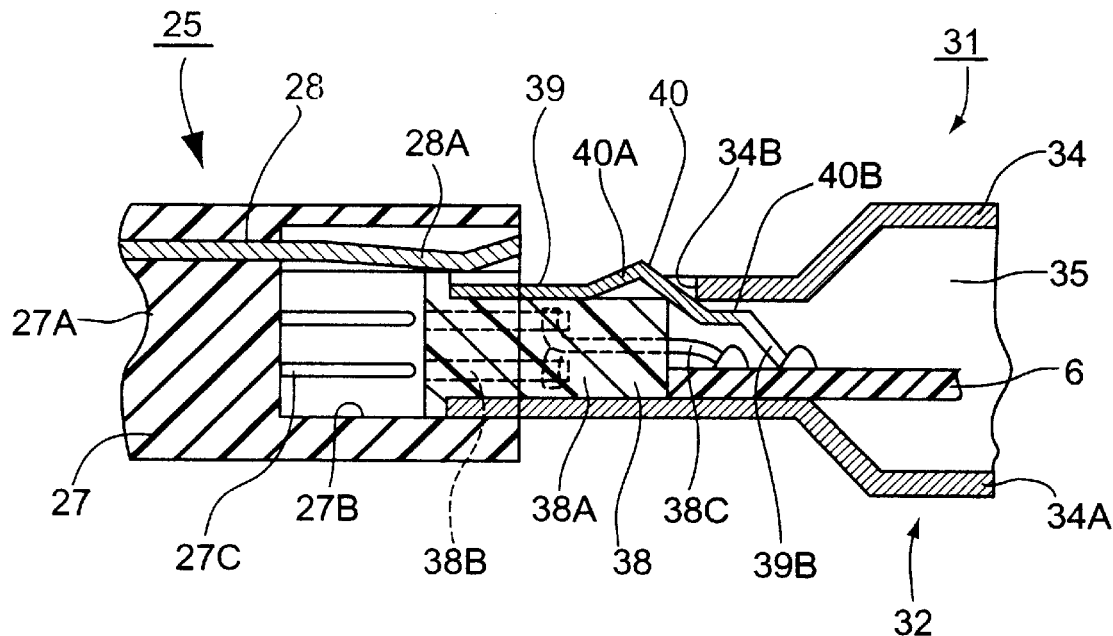
FIG. 3 is a longitudinal sectional view showing part of the 32-bit PC card of the first embodiment of the present invention prior to its insertion into a slot-side connector of a 32-bit card slot.
Figure 5:
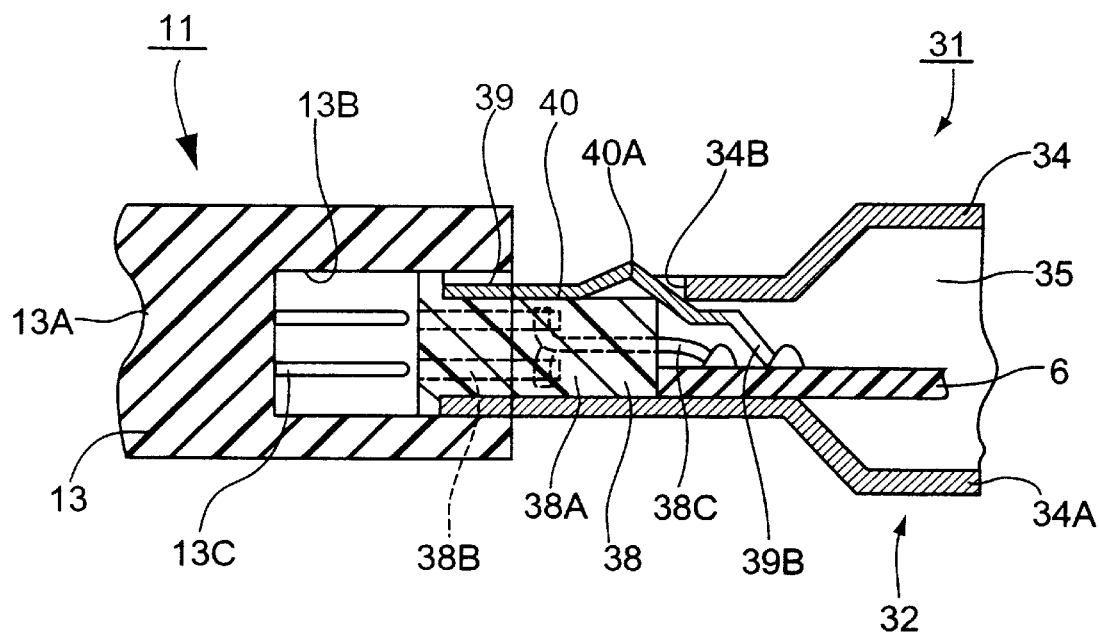
FIG. 5 is a longitudinal sectional view showing part of the 32-bit PC card of the first embodiment of the present invention prior to its insertion into a slot-side connector of a 16-bit card slot.

An elongated card-side connector 38 is mounted in the connector mounting opening 32A of the casing 32. As shown in FIG. 3 and FIG. 5, the card-side connector 38 includes an elongated rectangular parallelepiped-shaped body 38A constructed of a resin material, a total of 68 pin holes 38B arranged in 2 rows by 34 columns and extending from the front end toward the rear end of the body 38A. The computer 38 also includes terminals pins 38C with their base portions positioned in the deep portions of respective pin holes 38B and their ends projecting out of the rear end of the body 38A and connected to the circuit board 6.

Figure 2:
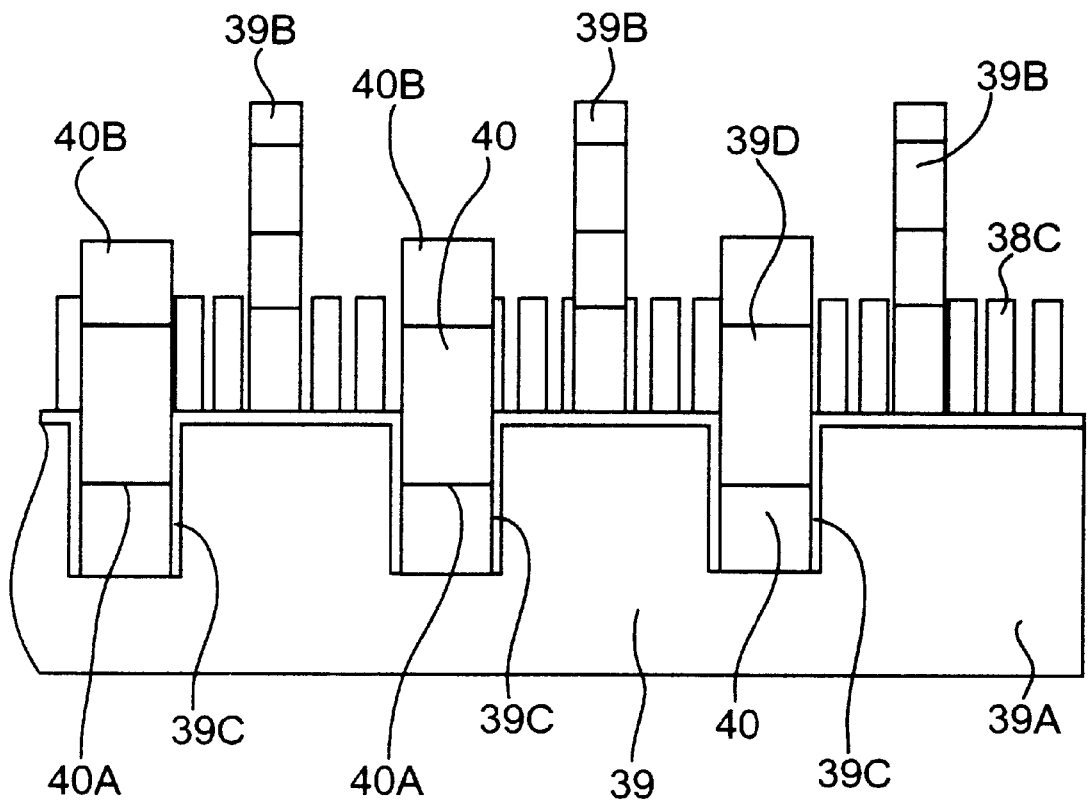
FIG. 2 is a plan view showing a card-side connector and ground electrode for use in the 32-bit PC card of the first embodiment of the present invention.

A ground electrode 39 is attached on the top surface of the card-side connector 38. The ground electrode 39, as shown in FIG. 2, is constructed of a conductive metal plate, and includes a planar electrode plate 39A affixed onto the one surface of the body 38A. The ground electrode 39 also includes a plurality of (for example, eight) ground terminals 39B extending from the electrode plate 39A toward the side of the circuit board 6. Notches 39C are cut from the rear end of the electrode plate toward the front end of the electrode plate 39A in the direction of insertion, and are positioned between the ground terminals 39B. The ground electrode 39 also includes a plurality of (for example, eight) lips 39D positioned between the notches 39C which extend backward from the electrode plate 39A. The lips 39D are bent to form elastic projections 40.

Preferably eight elastic projections 40 are formed in the electrode plate 39A of the ground electrode 39. The elastic projection 40, as shown in FIG. 3, is formed by bending the lip 39D of the electrode plate 39A of the ground electrode 39 at its mid-point in an inverted V-shape cross section such that the bent portion becomes a projecting portion 40A. The end of the lip 39D, namely, the end portion 40B of the elastic projection 40 is a free end and passes through the electrode plate accommodation cutout 34B. It also extends toward the circuit board accommodation space 35 of the casing 32.

Since the elastic projection 40 is formed by bending the lip 39D with its peak projecting upwardly, the projecting portion 40A has a plate spring structure that is deformed under pressure applied from above and thus exhibits elasticity.

When the card-side connector 38 is inserted into the slot-side connector 27 (FIGS. 3–4) to fit the PC card 31 into the 32-bit card slot 25, the card-side groove 36 is guided by a slot-side key groove 29 and the guide groove 37 is guided by a guide projection 30.

Figure 4:
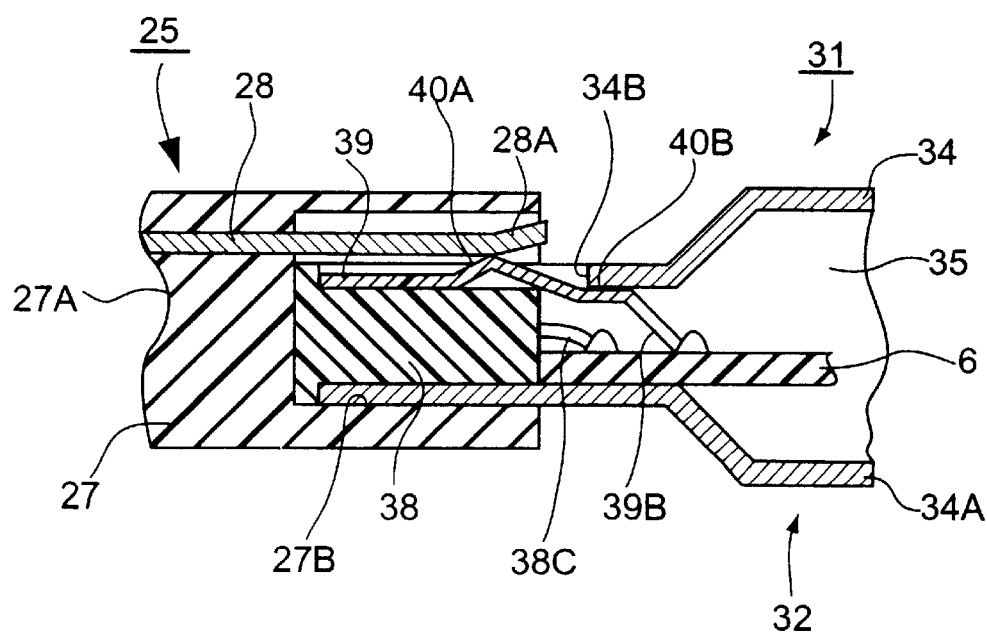
FIG. 4 is a longitudinal sectional view showing part of the 32-bit PC card of the first embodiment of the present invention which has been inserted into the slot-side connector of the 32-bit card slot.

Referring to FIG. 4, the elastic projection 40 formed on the ground electrode 39 is connected to the contact 28A of the receptacle ground electrode 28 of the 32-bit card slot 25. With its elasticity, the elastic projection 40 reinforces electrical connection in combination with the urging of the contact 28A, resulting in good contact.

Referring to FIG. 5, the insertion of the 32-bit PC card 31 into the 16-bit card slot 11 will now be discussed. Specifically, when the PC card 31 is inserted into the slot-side connector 13 of the 16-bit card slot 11, the card-side groove 36 is guided by a slot-side key groove 14 while the guide groove 37 is guided by a guide projection 15.

Figure 6:
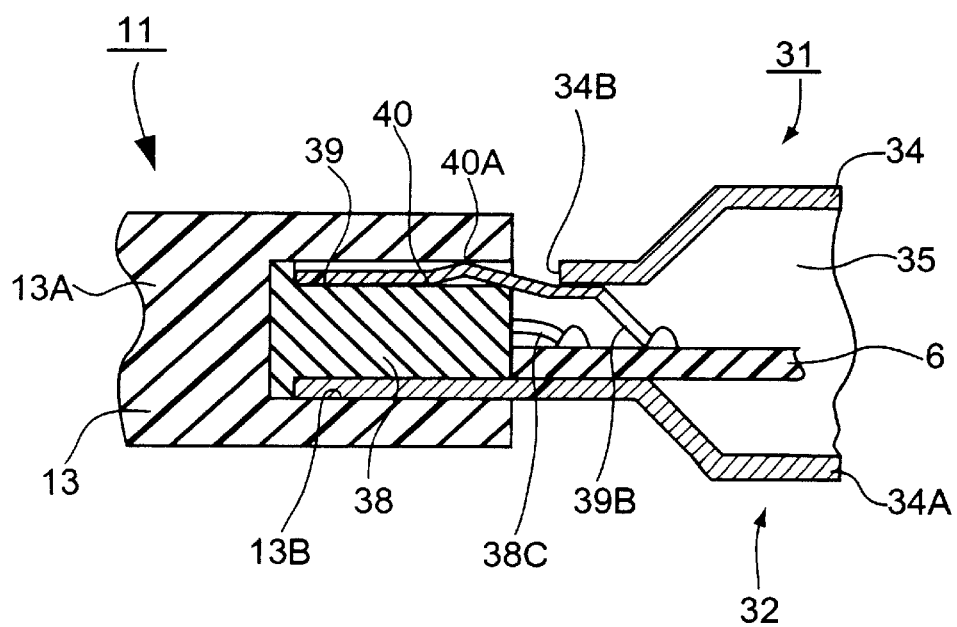
FIG. 6 is a longitudinal sectional view showing part of the 32-bit PC card of the first embodiment of the present invention which has been inserted into the slot-side connector of the 16-bit card slot.

When the card-side connector 38 of the PC card 31 is inserted into the connector socket 13B of the slot-side connector 13, the elastic projections 40 formed on the ground electrode 39 are elastically deformed by the connector socket 13B as shown in FIG. 6. In this way, the 32-bit PC card 31 prevents the 16-bit card slot 11 from being damaged.

As a result, the 32-bit PC card 31 of this embodiment is mounted without damaging the card insertion opening 11A of the 16-bit card slot 11 and the connector socket 13B of the slot-side connector 13. Furthermore, the elastic projections 40 recover their original form via their own elasticity after the PC card 31 is pulled out, and the PC card 31 can also be mounted into the 32-bit card slot 25 as already described.

The PC card 31 of this embodiment can be inserted in the 32-bit card slot 25 or the 16-bit card slot 11. The PC card 31 thus enjoys wider applications than prior art cards.

Since the end portion 40B of the elastic projection 40 is allowed to pass the electrode plate accommodation cutout 34B of the panel 34 and extend toward the circuit board accommodation space 35 of the casing 32, the elastic projection 40 is elastically deformed against the connector socket 13B when the PC card 31 is inserted into the 16-bit card slot 11. The end portion 40B of the elastic projection 40 simply extends backwards behind the card-side connector 38 in the direction of insertion, and the electrode plate accommodation cutout 34B keeps the end portion 40B from projecting out of the panel 34. When the PC card 31 is pulled out of the 16-bit card slot 11, the end portion 40B of the elastic projection 40 is prevented from being caught or raised by a card insertion hole 12A or the like. The above arrangement contributes to a long service life of the elastic projections 40.

Figure 7:
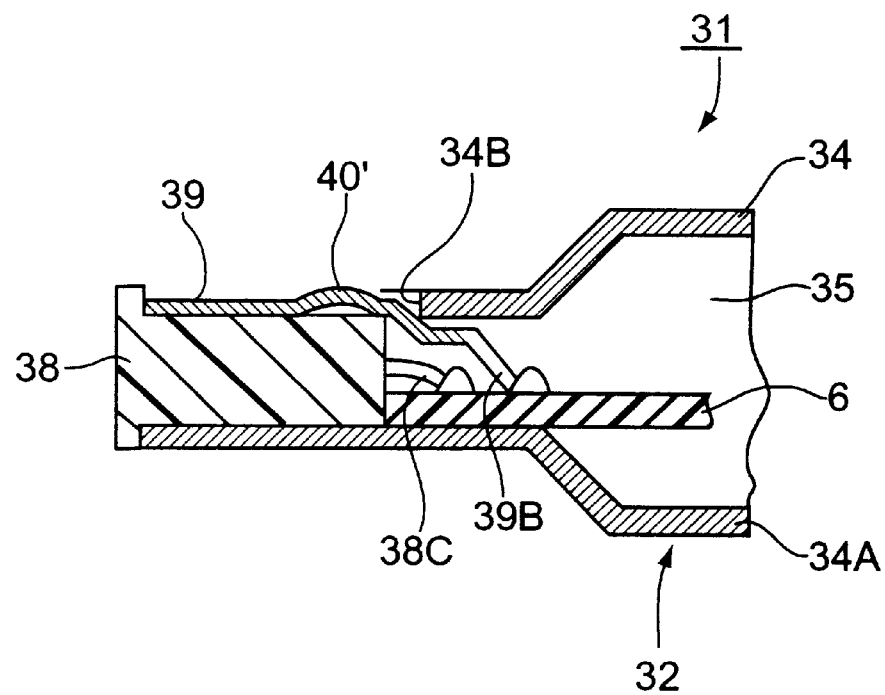
FIG. 7 is a longitudinal sectional view showing part of the insertion side of the 32-bit PC card according to a first modification.

In this embodiment, the elastic projection 40 is bent in an inverted V shape, but alternatively, the present invention may use an elastic projection 40' that is formed by curving the lip in a circular arc in cross section between the notches as shown in a first modification in FIG. 7.

Figure 8:
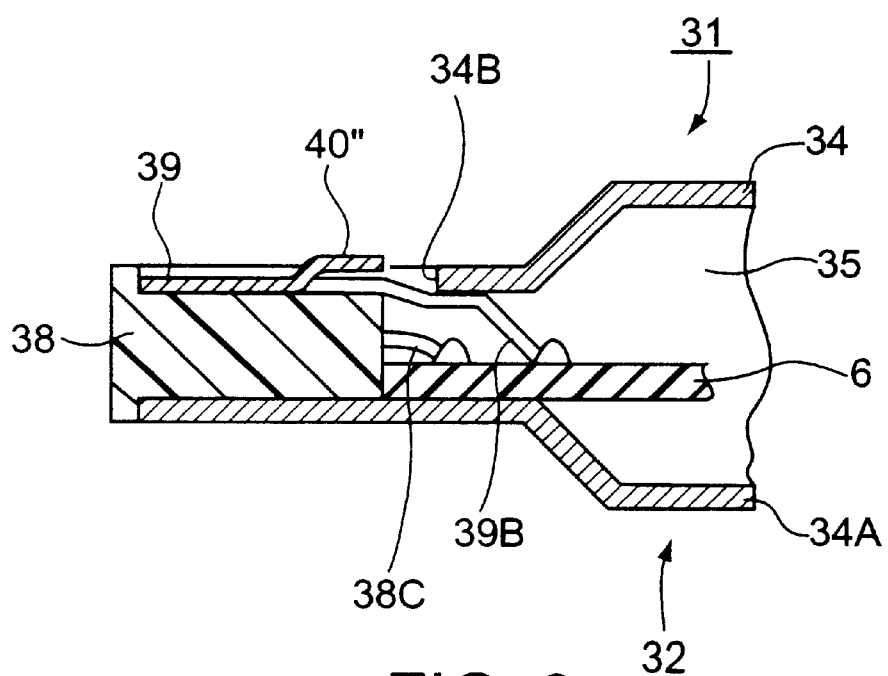
FIG. 8 is a longitudinal sectional view showing part of the insertion side of the 32-bit PC card according to a second modification.

As shown in a second modification in FIG. 8, the lip 39D may be cut in a U shape and raised in the notch to form an elastic projection 40". The elastic projection may be of any configuration as long as it is structured such that elasticity is achieved at the lip 39D when the card is inserted into the card slot.

In this embodiment, the end portion 40B of the elastic projection 40 is a free end so that it extends toward the circuit board accommodation space 35 of the casing 32, but the present invention is not limited to this, and the end portion 40B may be secured to the circuit board 6. When the end portion 40B is connected to the ground of the circuit board 6, the ground terminal 39B of the ground electrode 39 may be dispensed with.

In this embodiment, preferably eight ground terminals 39B extending toward the circuit board 6 from the electrode plate 39A of the ground electrode 39 are employed, but the present invention is not limited to this, and the number of ground terminals may be any number within a range from 1 to 9, or even larger in view of the wiring of the circuit board 6.

In this embodiment, the PC card of a 32-bit specification has been discussed, but the present invention is not limited to this, and for example, the present invention may work in the PC cards of a 64-bit specification, or a 128-bit specification, in combination with the card connector of a 16-bit specification.

Personal computers equipped with card slots having a 16-bit specification with a driving voltage of 3.3 V are available, and the present invention works equally well in such personal computers.

As described above, the ground electrode attached on the connector of the PC card includes a planar electrode plate secured to the connector, at least one ground terminal extending from the electrode plate toward the circuit board, and a plurality of elastic projections formed in the electrode plate to provide elasticity when the PC card is inserted into the card slot in the personal computer side. With this arrangement, the elastic projections of the ground electrode are pressed and elastically deflected when the PC card is inserted in a low-bit card slot even when the card slot has no portion for electrically coupling to the ground electrode.

When the PC card is pulled out of the card slot, the elastic projections having elasticity in the direction of projection recover their original forms. The PC card can thus be inserted into a high-bit card slot having an electrode that receives the ground electrode. The PC card thus enjoys wider applications than prior art cards.

The electrode plate of the ground electrode has a plurality of notches running in parallel with the direction of insertion, and each of the elastic projections is configured to have the structure of a plate spring by bending a lip placed between the notches, at the mid-point of the lip. With this arrangement, the elastic projections having the plate spring structure come into contact with and are pressed and elastically deflected against the insertion hole of the card slot when the PC card is inserted into the low-bit card slot having no portion for receiving the ground electrode. The PC card is thus mounted without damaging the card slot side.

The electrode plate of the ground electrode has a plurality of notches running from the end of the electrode plate in parallel with the direction of insertion of the PC card. Each of the elastic projections is configured to have a flat spring-like shape by bending a lip placed between the notches at the mid-point of the lip, and the end of the lip extends toward the accommodation space of the casing. With this arrangement, the elastic projections having the plate spring structure are pressed and elastically deflected against the insertion hole of the card slot or the like when the card is inserted into a low-bit card slot having no portion for receiving the ground electrode. The PC card is thus mounted without damaging the card slot side.

By allowing the end of the lip to extend into the accommodation space of the casing, the end of the lip (elastic projection) is prevented from being caught by or raised by the insertion hole of the card slot when the PC card is pulled out of the card slot. The above arrangement contributes to a long service life of the elastic projections.

Figure 9:
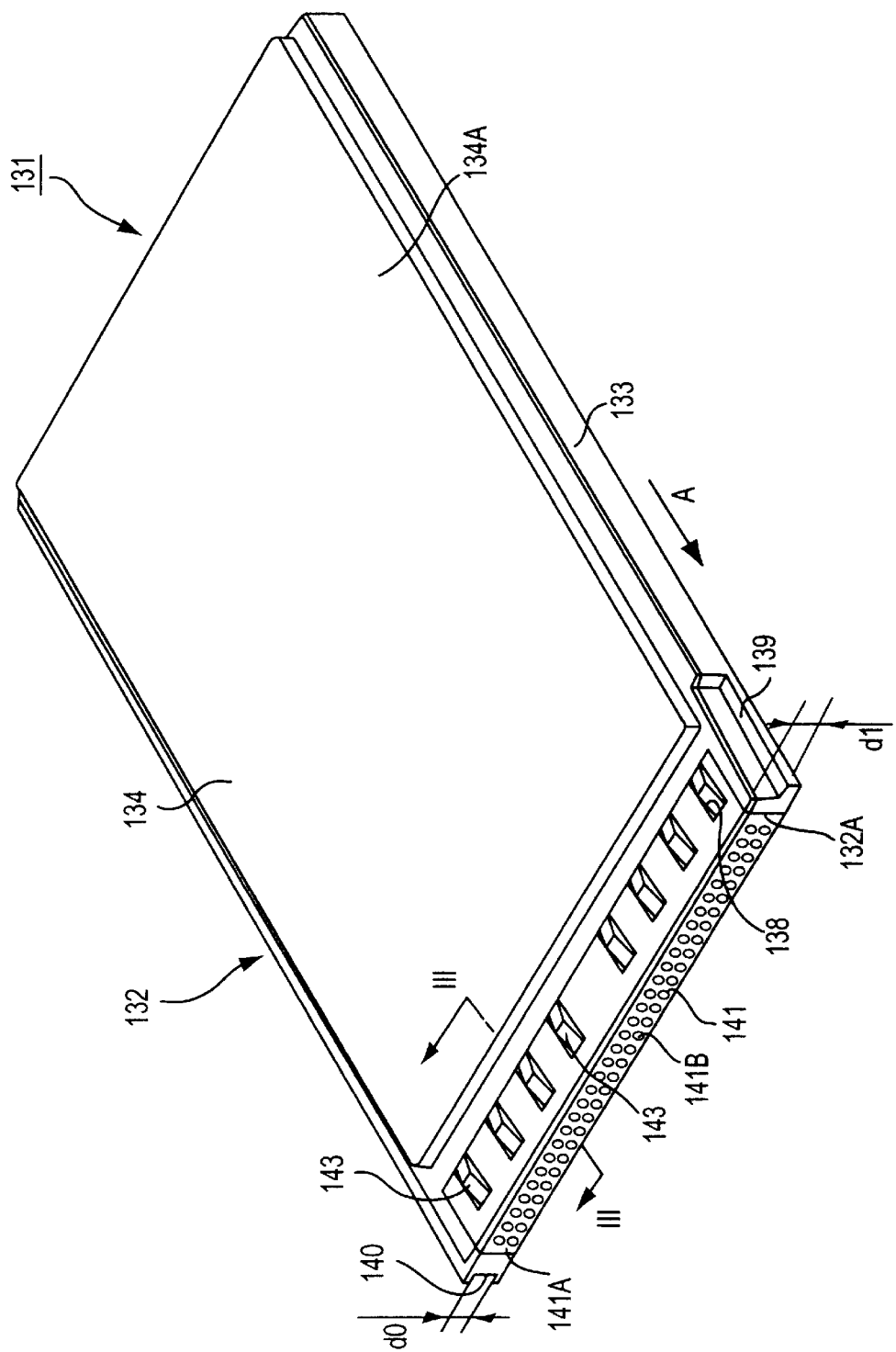
FIG. 9 is a perspective view of a PC card of a second embodiment of the present invention.

Referring to FIG. 9 through FIG. 20, a second embodiment of the present invention is now discussed in detail. There is shown in FIG. 9 a PC card 131 of the second embodiment compatible with both 16-bit mode and 32-bit mode operation having a casing 132 of a thin-plate configuration, serving as an external casing of the PC card 131. The casing 132 includes a thin frame body 133 with its top and bottom sides opened, a top panel 134 having a rectangular projecting portion 134A, for closing the top opening of the frame body 133, and a bottom panel 135 (FIG. 10) having a rectangular projecting portion 135A, for closing the bottom opening of the frame body 133, and has a circuit board accommodation space 136 therewithin.

The circuit board accommodation space 136 of the casing 132 houses a circuit board 106, and electronic components 107 mounted on the circuit board 106 are compatible not only with a 32-bit specification using a driving voltage of 3.3 V but also a 16-bit specification using a driving voltage of 5.0 V.

One end of the casing 132 is opened and forms a connector mounting opening 132A, and a card-side connector 141 to be described later is secured in the connector mounting opening 132A. An arrow A shown in FIG. 9 represents the direction of insertion of the PC card 131.

Figure 10:
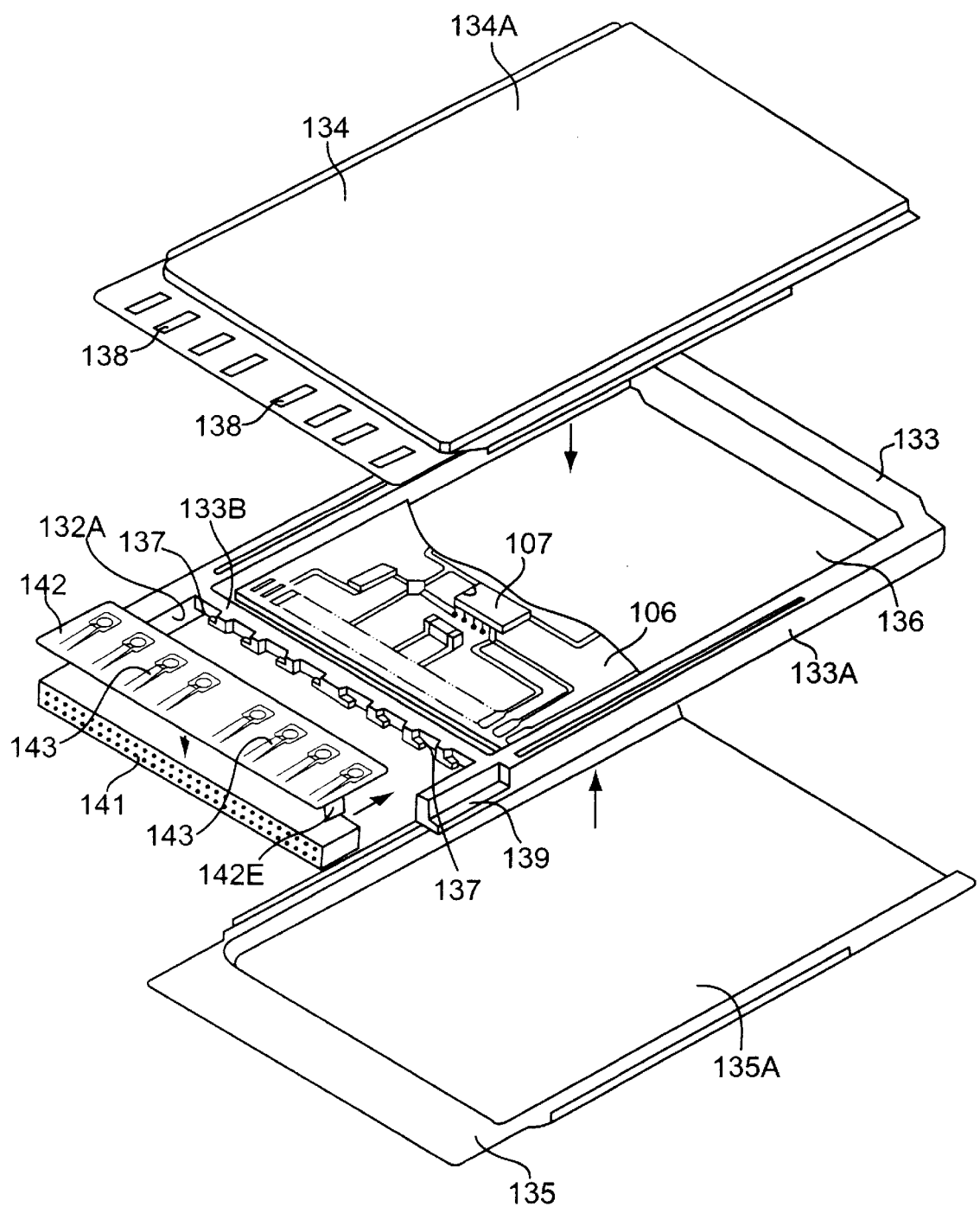
FIG. 10 is an exploded perspective view showing a frame body, a top panel, a bottom panel, a card-side connector and a ground electrode forming the PC card of the second embodiment of the present invention.

As shown in FIG. 10, the frame body 133 is formed of a U-shaped frame 133A and a beam 133B that connects the ends of the frame 133A. Projection socket portions 137 to be described below are formed on the beam 133B.

The projection socket portions 137 receive elastic projections 143 of a ground electrode 142 to be described later. The projection socket portions 137 preferably include eight recesses that are spaced at predetermined intervals on the beam 133B of the frame body 133. When the frame body 133 is constructed of a resin material, the projection socket portions 137 and the frame body 133 are preferably formed in an integral structure.

A plurality of projection guiding holes 138 are drilled in the top panel where the connector mounting opening 132A is positioned, and the projection guiding hole 138 is rectangular in shape. The elastic projections 143 of the ground electrode 142 project through respective projection housing holes 138.

The PC card 131 is provided with a card-side key groove 139 on its left-hand side with respect to the direction of insertion viewed from behind. The card-side key groove 139 is formed by cutting the top surface of the frame body 133 at the left-hand side wall with respect to the direction of insertion in the vicinity of the connector mounting opening 132A of the frame body 133 of the casing 132. The card-side key groove 139 has a width d1 equal to that of the card-side key groove 108 of the 16-bit PC card 101.

The PC card is provided with a guide groove 140 on its right-hand side with respect to the direction of insertion. The guide groove 140 is formed by providing a relief in the side wall of the frame body 133 on the right-hand side with respect to the direction of insertion, in the vicinity of the connector mounting opening 132A of the frame body 133 of the casing 132. The guide groove 140 has a groove width d0 equal to that of the guide groove 122 of the 32-bit PC card 106.

An elongated card-side connector 141 is arranged in the connector mounting opening 132A of the casing 132. The card-side connector 141 includes an elongated rectangular parallelepiped body 141A constructed of a resin material, a total of 68 pin holes 141B arranged in 2 rows by 34 columns and extending from the front end toward the rear end of the rectangular parallelepiped body 141A, and terminal pins 141C with their base portions positioned in the deep portions of respective pin holes 141B and their ends projecting out of the rear end of the rectangular parallelepiped body 141A and connected to the circuit board 106.

A ground electrode 142 is attached on the top surface of the card-side connector 141. The ground electrode 142, as shown in FIG. 12 through FIG. 15, is constructed of a conductive metal plate, and includes a planar electrode plate 142A running on the top surface of the card-side connector 141. The ground electrode 142 also includes a plurality of (for example, eight) ground terminals 142B extending from the electrode plate 142A toward the ground of the circuit board 106. A plurality of notches 142C (for example, eight) are formed by notching the electrode plate 142A at three sides but not the side opposite to the ground terminal 142B, namely, not the side opposite to the circuit board 106. the ground electrode 142 also includes a plurality of (for example, eight) lips 142D which have, in combination with the notches 142C, their support ends positioned on the front end side (with respect to the direction of insertion) and their free ends extending backwards (with respect to the direction of insertion). Mounting portions 142E are arranged on both right-hand and left-hand sides of the electrode plate 142A and make a sharp angle with respect to the surface of the electrode plate 142A. The length of each lip 142D is bent to form an elastic projection 143 as will be described later.

Figure 13:
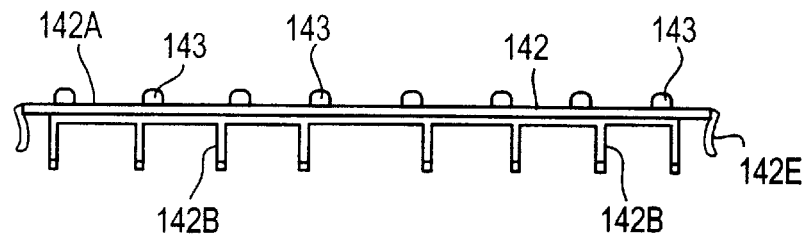
FIG. 13 is a side view of the ground electrode taken along line V—V shown in FIG. 12.

Since the mounting portion 142E makes a sharp angle with respect to the electrode plate 142A as shown in FIG. 13 and is elastic, the ground electrode 142 is easily mounted to the rectangular parallelepiped body 141A of the card-side connector 141 with high precision and does not exhibit lateral deviation when the PC card 131 is assembled.

Figure 11:
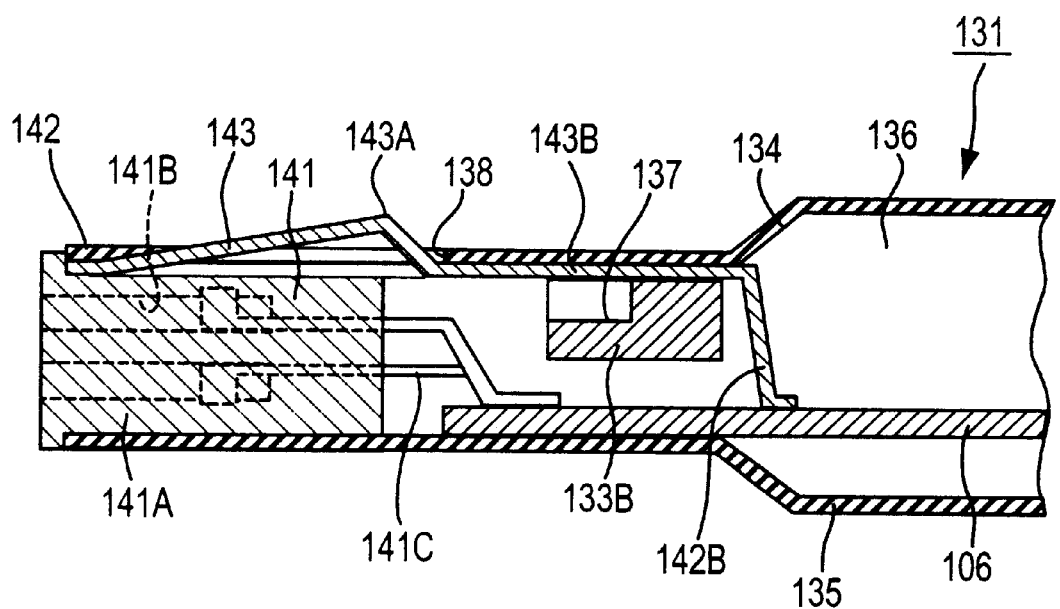
FIG. 11 is a longitudinal sectional view showing part of an insertion side of the PC card of the second embodiment of the present invention.
Figure 12:
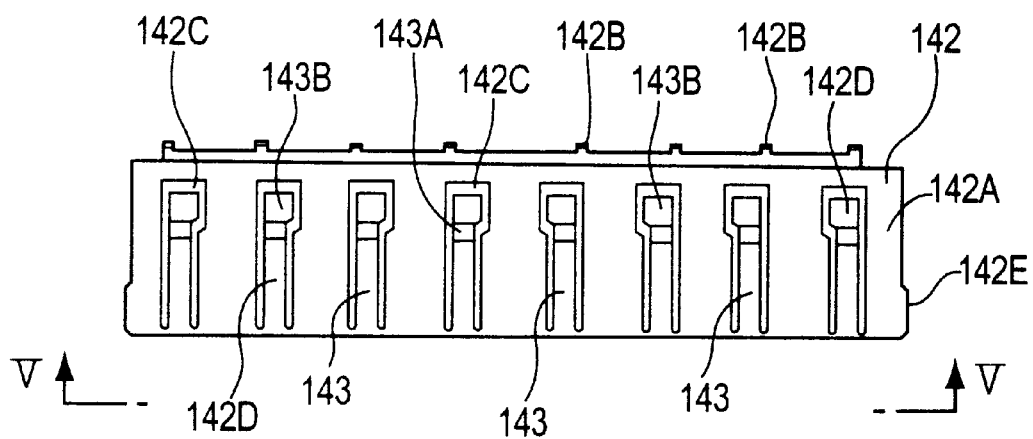
FIG. 12 is a plan view showing the ground electrode used in the PC card of the second embodiment of the present invention.

Preferably eight planar elastic projections 143 are formed in the electrode plate 142A of the ground electrode 142 and the elastic projection 143, as shown in FIG. 11, is formed by bending the lip 142D of the electrode plate 142A of the ground electrode 142 at its mid-point in an inverted-V shape such that the bent portion becomes a projecting portion 143A which projects through the projection housing hole 138 formed in the top panel 134.

The end of the lip 142D, namely, the end portion 143B of the elastic projection 143 becomes a free end (which is usually urged downward below the top panel 134) when the elastic projection 143 is pressed from above by an external force and is preferably received in the projection socket portion 137 of the beam 133B (see FIG. 19).

Figure 14:
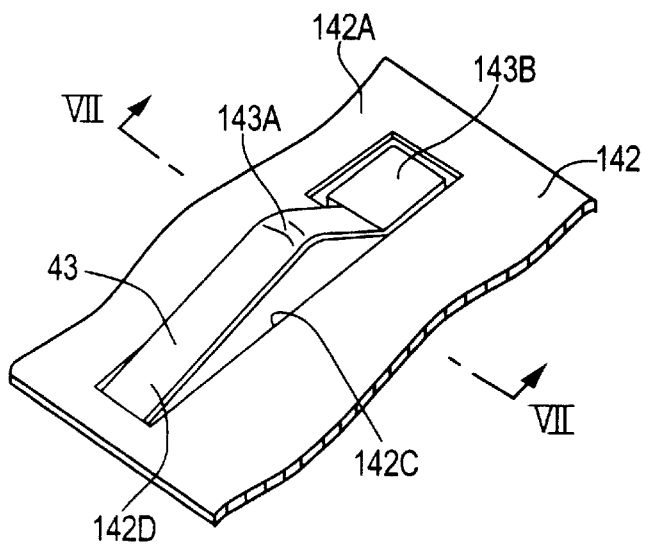
FIG. 14 is an enlarged perspective view of an elastic projection shown in FIG. 13.
Figure 15:
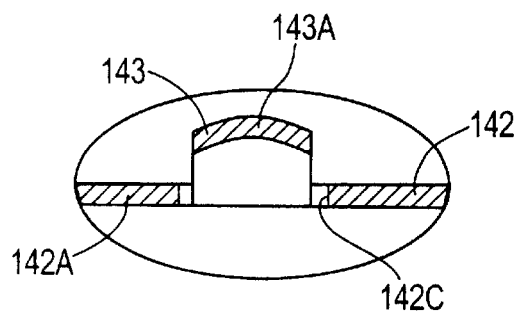
FIG. 15 is a longitudinal sectional view of the elastic projection taken along line VII—VII shown in FIG. 14.

As shown in FIG. 14 and FIG. 15, each elastic projection 143 at its projecting portion 143A has a circular arc shape in cross section. When the notch 142C is cut in the electrode plate 142A, a burr edge is generated which protrudes inwardly into the elastic projection 143. Thus, the edge of the elastic projection 143 close to the projecting portion 143A projecting out of the projection housing hole 138 is prevented from being caught on the projection housing hole 138.

Since the planar lip 142D is bent with its peak projecting upwardly in this way, the projecting portion 143A of the elastic projection 143 is pressed from above, the end portion 143B is deformed toward the casing 132, and thus the projection 143 exhibits elasticity.

Figure 16:
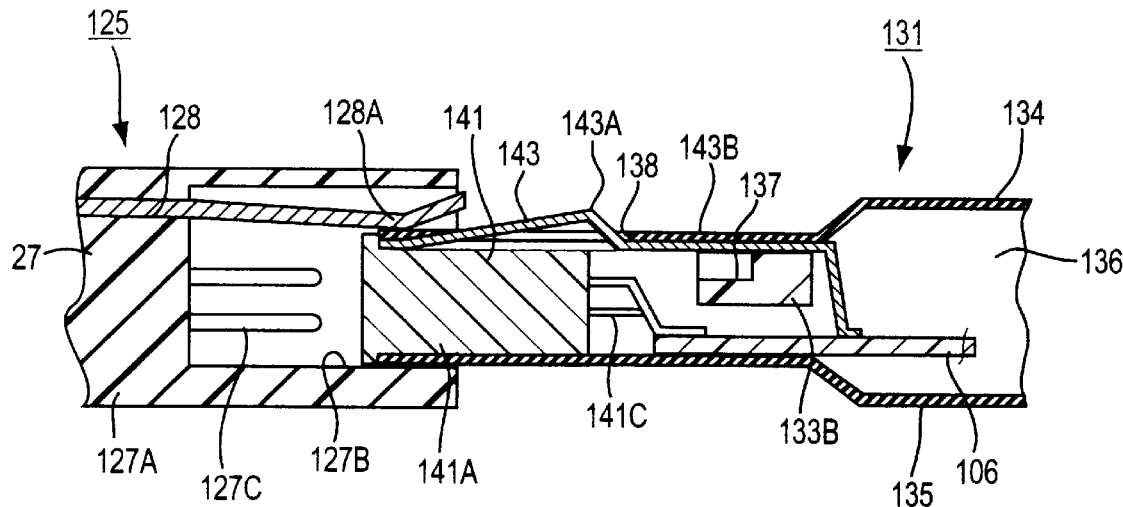
FIG. 16 is a longitudinal sectional view showing part of the PC card of the second embodiment of the present invention prior to its insertion into a slot-side connector of a 32-bit card slot.
Figure 17:
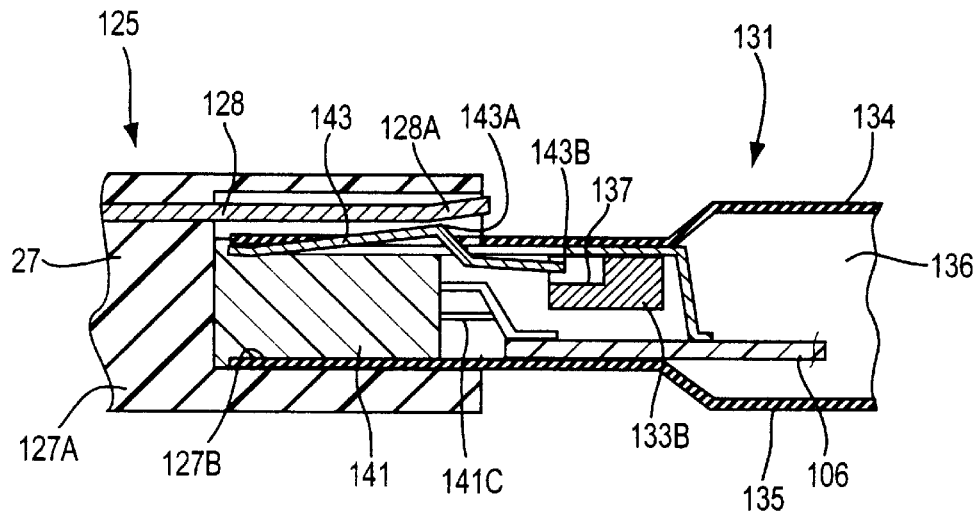
FIG. 17 is a longitudinal sectional view showing part of the PC card of the embodiment which has been inserted into the slot-side connector of the 32-bit card slot.

The insertion of the PC card 131 into the 32-bit card slot 25 is now discussed, referring to FIG. 16 and FIG. 17. When the card-side connector 141 is inserted into the slot-side connector 127, the card-side key groove 139 is guided by the slot-side key groove 129, and the guide groove 140 is guided by the guide projection 30.

Referring to FIG. 16, the elastic projection 143 formed in the ground electrode 141 is connected to the contact 128A of the receptacle ground electrode 128 of the 32-bit card slot 125. With its elasticity, the elastic projection 143 reinforces electrical connection in combination with the urging of the contact 128A, resulting good contact.

Figure 18:
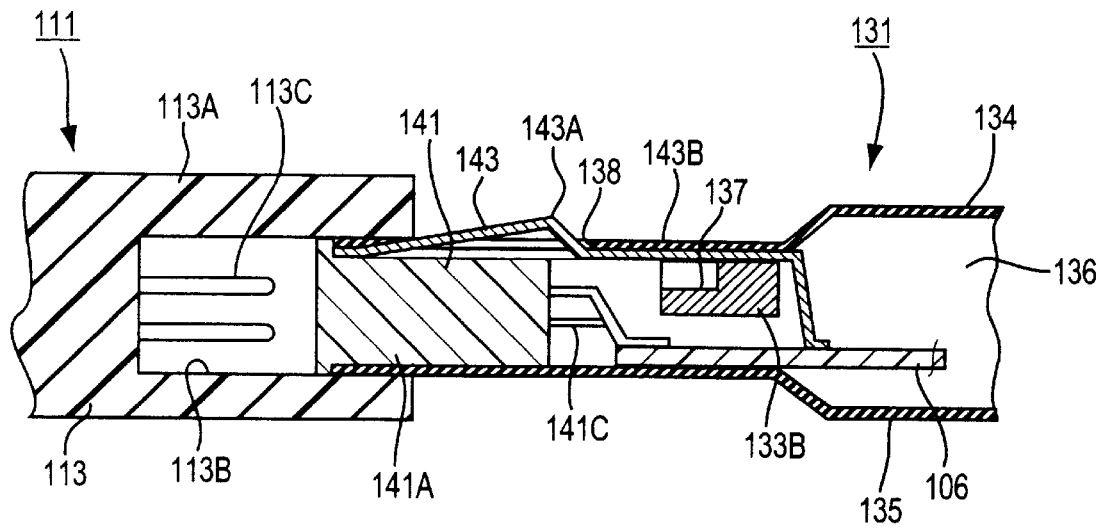
FIG. 18 is a longitudinal sectional view showing part of the PC card of the second embodiment of the present invention prior to its insertion into a slot-side connector of a 16-bit card slot.
Figure 19:
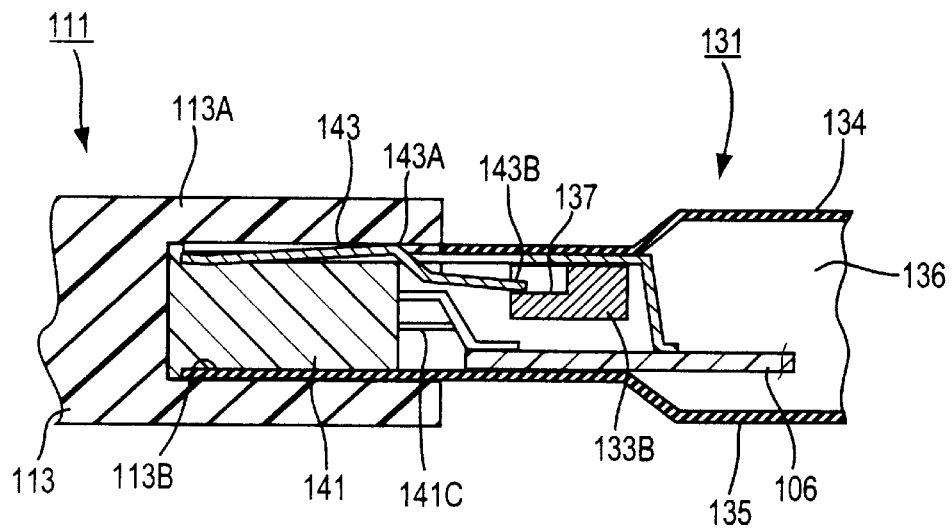
FIG. 19 is a longitudinal sectional view showing part of the PC card of the second embodiment of the present invention which has been inserted into the slot-side connector of the 16-bit card slot.

Referring to FIG. 18 and FIG. 19, the insertion of the PC card 131 into a 16-bit card slot 111 is now discussed.

Specifically, when the PC card 131 is inserted into the slot-side connector 113 of the 16-bit card slot 111, the card-side groove 139 is guided by the slot-side key groove 114 while the guide groove 140 is guided by the guide projection 115.

When the card-side connector 141 of the PC card 131 is inserted into the connector socket 113B of the slot-side connector 113, the projecting portion 143A of the elastic projection 143 of the ground electrode 142 is pressed by the connector socket 113B such that the end portion 143B is deflected into the casing 132 and received by the projection socket portion 137 (shown in FIG. 19). In this way, the 32-bit PC card 131 is mounted without damaging the 16-bit card slot 111.

The PC card 131 is mounted into the 16-bit card slot 111 without damaging the card insertion opening 112A of the 16-bit card slot 111 and the connector socket 113B of the slot-side connector 113. Further, the elastic projections 143 recover their original form via their own elasticity after the PC card 131 is pulled out, and the PC card 131 can also be mounted on into the 32-bit card slot 125 as already described.

As a result, the PC card 131 can be inserted in the 32-bit card slot 125 or the 16-bit card slot 111, thereby enjoying wider applications than prior art cards.

Since the projecting portion 143A of the elastic projection 143 is allowed to project upward through the projection guiding hole 138 of the top panel 134, and the end portion 143B extends over to the projection socket portion 137, the end portion 143B of the elastic projection 143 is received by the projection socket portion 137 (as shown in FIG. 19) when the PC card 131 is inserted into the 16-bit card slot 111. This arrangement prevents the end portion 143B from contacting the terminal pin 141C of the card-side connector 141, and the reliability of the PC card 131 is thus increased.

When the PC card 131 is pulled out of the card slot 111, the elastic projection 143 recovers its form via its elasticity, and the end portion 143B is urged toward the underside of the top panel 134. This arrangement prevents the end portion 143B from rising externally upwardly. Since the end portion 143B of each elastic projection 143 has a circular arc shape in cross section, the end portion is prevented from being caught on the projection guiding hole 138 when the elastic projection 143 is deflected.

Each projection guiding hole 138, surrounding the respective elastic projection 143, prevents the elastic projection 143 from being deflected and damaged even when an external force acts on the elastic projection 143, and the above arrangement contributes to a long service life of each elastic projection 143.

When the PC 131 is assembled, the ground electrode 142 is secured with its mounting portion 142E clamping the rectangular parallelepiped body 141A of the card-side connector 141 as shown in FIG. 10, and the soldering of each ground terminal 142B of the ground electrode 142 to the circuit board 106 is easily carried out and the assembly efficiency is thus improved.

Figure 20:
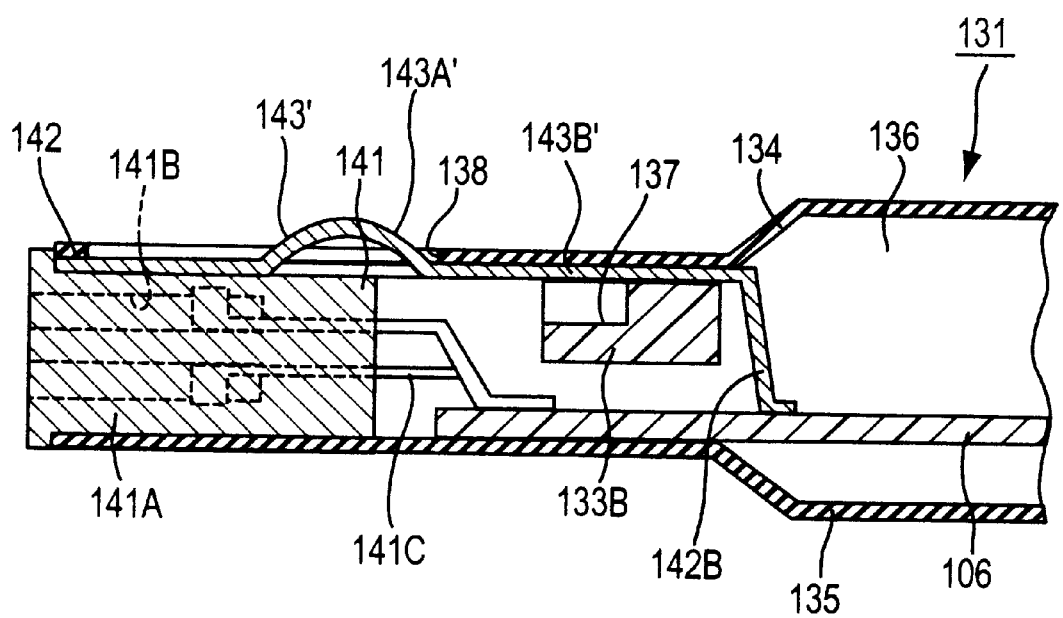
FIG. 20 is a longitudinal sectional view showing part of the insertion side of the 32-bit PC card according to a modification.

In the discussion of this embodiment, the elastic projection 143 has a generally inverted V shape projecting portion 143A, but alternatively, the lip surrounded by the notch may be curved in a circular arc shape as shown in FIG. 20, and the elastic projection 143' may thus be formed by the circular arc portion of a projecting portion 143A'. An end portion 143B' would thus extend over to the projection socket portion 137.

Although the eight ground terminals 142B extending from the electrode plate 142A of the ground electrode 142 toward the circuit board 106 are employed in the discussion of the above embodiment, the present invention is not limited to this, and the number of the ground terminals may be any number within a range from 1 to 9, or even larger in view of the wiring of the circuit board 106.

In the above discussion, each elastic projection 143 has a circular arc shape in cross section, but alternatively, the elastic projection may be bent inwardly in a curve in cross section. Alternatively, the elastic projection 143 may be planar and flat in cross section.

In this embodiment, the PC card of a 32-bit specification has been discussed, but the present invention is not limited to this, and for example, the present invention may work in the PC cards of a 64-bit specification, or a 128-bit specification, combined with the card connector of a 16-bit specification.

Personal computers equipped with card slots having a 16-bit specification with a driving voltage of 3.3 V are available, and the present invention works equally well in such personal computers.

As described above, the projection guiding holes are drilled in one of the top and bottom panels forming the casing, positioned above the connector mounting opening, and the elastic projections projecting through the projection guiding holes are formed in the ground electrode. When the PC card is inserted into a low-bit card slot having no portion for receiving the ground electrode, the elastic projections are deflected into the casing, and the PC card is thus seated in the card slot.

Since the elastic projections recover their form when the PC card is pulled out of the card slot, the PC card is compatible with a high-bit card slot having an electrode receiving the ground electrode and a low-bit card slot having no electrode receiving the ground electrode. Thus, the PC card enjoys wider applications than prior art cards.

Since the elastic projections project out of the projection guiding holes of the top panel, the projection guiding holes prevent the elastic projections from being damaged even when external lateral force acts on the elastic projections, and the service life of the elastic projections is thus prolonged, and the reliability of the PC card is heightened.

A plurality of notches are formed in the electrode plate of the ground electrode by cutting the electrode plate at three sides except the side opposite to the circuit board. The elastic projections are formed as a plate spring by bending a lip at the mid-point, with one side used as a support end, and each elastic projection having the plate spring structure. When the PC card is inserted into the low-bit card slot, the projecting portions of the elastic projections of the ground electrode come into contact with the insertion hole of the card slot with the elastic projections deformed.

At least a portion of the elastic projection projecting out of the projection guiding hole of the panel is curved in longitudinal cross-section. With this arrangement, the end of the elastic projection is prevented from being caught on the projection guiding hole when the elastic projection is deflected. The above arrangement contributes to a long service life of the elastic projections.

The frame body of the casing has a socket portion for receiving a free end of the elastic projection. When the ground electrode of the PC card is inserted into a low-bit card slot, the free end of the elastic projection is received in the socket portion of the frame body, the free end of the elastic projection is prevented from contacting the terminal pin, and the reliability of the PC card in terms of electrical characteristics is enhanced.

The present invention has been discussed in connection with a PC card compatible with both 16-bit and 32-bit slots. The present invention is also adaptable to a PC card that has a combination of other specifications. The hardware structure of the PC card is not limited to the ones shown, and any structure is acceptable as long as it provides equivalent functions.

What is claimed is:

1. A circuit card comprising:

a circuit board having a ground potential node;

a connector for coupling said circuit card to an external device, said external device including a mating connector disposed within a card slot, said card slot for receiving and guiding said connector to engage said mating connector; and at least one elastic projection being electrically coupled to said ground potential node and disposed with said connector such that said elastic projection resiliently engages with a surface of said card slot when said circuit card is coupled to said external device;

wherein said connector includes spaced apart front and rear surfaces and an upper surface spanning said front and rear surfaces, said at least one elastic projection being disposed at said upper surface and providing elastic deflection in at least a first direction normal to said upper surface; and further comprising a substantially planar electrode plate coupled to said upper surface of said connector, said elastic projections being coupled to said electrode plate at one end and extending therefrom in a cantilevered fashion.

2. The circuit card of claim 1, wherein said elastic projections extend rearwardly away from said front surface of said connector.

3. The circuit card of claim 2, wherein said electrode plate includes front and rear edges, said front edge being disposed proximate to said front surface of said connector, said elastic projections extending rearwardly past said rear edge of said electrode plate.

4. The circuit card of claim 1, wherein said elastic projections each include a reentrant bend disposed between said one end and a distal end thereof such that said reentrant bend forms a projecting portion extending substantially out of the plane of said electrode plate and resiliently engages with said surface of said card slot when said circuit card is coupled to said external device.

5. The circuit card of claim 4, wherein said reentrant bend forms a substantially V-shaped cross section in said elastic projection.

6. The circuit card of claim 4, wherein said reentrant bend forms a substantially U-shaped cross section in said elastic projection.

7. The circuit card of claim 1, wherein said elastic projections each include a bend disposed between said one end and a distal end thereof such that a projecting portion extending substantially out of the plane of said electrode plate is formed, said projection portion resiliently engaging said surface of said card slot when said circuit card is coupled to said external device.

8. The circuit card of claim 1, wherein each elastic projection includes a projecting portion extending substantially out of the plane of said electrode plate which resiliently engages said surface of said card slot when said circuit card is coupled to said external device, said circuit card further comprising an upper panel spanning a top portion of said circuit card, said upper panel including a cutout portion proximate to said upper surface of said connector such that said projection portions extend substantially out of said cutout portion.

9. The circuit card of claim 8, wherein said upper panel includes a rearward edge at said cutout portion forming an engagement lip, said distal end of said elastic projection being substantially urged against said engagement lip when said circuit card is not received in said card slot by cantilever action and being substantially urged away from said engagement lip when said said projection portion resiliently engages said surface of said card slot.

10. A circuit card comprising:

a circuit board having a ground potential node;

a connector for coupling said circuit card to an external device, said external device including a mating connector disposed within a card slot, said card slot for receiving and guiding said connector to engage said mating connector; and a substantially planar electrode plate coupled to an upper surface of said connector and including front and rear edges and at least one elastic projection extending from one end rearwardly away from said front edge in a cantilevered fashion, said at least one elastic projection being electrically coupled to said ground potential node and disposed relative to said connector such that said elastic projection resiliently engages with a surface of said card slot when said circuit card is coupled to said external device.

11. The circuit card of claim 10, wherein said connector includes spaced apart front and rear surfaces spanned by said upper surface, said front edge of said electrode plate being disposed proximate to said front surface of said connector, said elastic projections extending rearwardly but not past said rear edge of said electrode plate.

12. The circuit card of claim 11, wherein said electrode plate includes relief notches at peripheral edges of said elastic projections except at said one end such that said elastic projections are formed integrally from said electrode plate.

13. The circuit card of claim 11, wherein each elastic projection includes a projecting portion extending substantially out of the plane of said electrode plate which resiliently engages said surface of said card slot when said circuit card is coupled to said external device.

14. The circuit card of claim 13, wherein said projection portion includes a reentrant bend disposed between said one end and a distal end thereof such that said projecting portion extends substantially out of the plane of said electrode plate and resiliently engages with said surface of said card slot when said circuit card is coupled to said external device.

15. The circuit card of claim 14, wherein said reentrant bend forms a substantially V-shaped cross section in said elastic projection.

16. The circuit card of claim 14, wherein said reentrant bend forms a substantially U-shaped cross section in said elastic projection.

17. The circuit card of claim 13, further comprising an upper panel spanning a top portion of said circuit card, said upper panel including at least one cutout portion proximate to said upper surface of said connector such that said at least one projection portions extend substantially out of said cutout portions.

18. The circuit card of claim 17, wherein said upper panel includes a rearward edge at each cutout portion forming an engagement lip, said distal ends of said elastic projections being substantially urged against said engagement lip when said circuit card is not received in said card slot by cantilever action and being substantially urged away from said engagement lip when said said projection portion resiliently engages said surface of said card slot.

19. The circuit card of claim 17, further comprising an engagement beam disposed proximate to said rear surface of said connector, said distal ends of said elastic projections being substantially urged against said engagement beam when said circuit card is received in said card slot.

* * * * *